(12) United States Patent
Brown

(10) Patent No.: US 6,931,407 B1
(45) Date of Patent: Aug. 16, 2005

(54) SYSTEM FOR USING A FLOATING PALLET FOR A DIGITAL ASSET MANAGEMENT SYSTEM IN A PLURALITY OF DIFFERENT APPLICATIONS

(75) Inventor: Timothy Joel Brown, Hillsboro, OR (US)

(73) Assignee: Extensis, Inc., Portland, OR (US)

( * ) Notice: Subject to any disclaimer, the term of this patent is extended or adjusted under 35 U.S.C. 154(b) by 75 days.

(21) Appl. No.: 09/625,991

(22) Filed: Jul. 26, 2000

(51) Int. Cl.[7] .............................................. G06F 17/30
(52) U.S. Cl. .................... 707/100; 707/10; 709/229
(58) Field of Search ...................... 707/10, 100, 104; 709/223, 229; 705/59; 703/3; 717/11

(56) References Cited

U.S. PATENT DOCUMENTS

| | | | |
|---|---|---|---|
| 5,915,250 A | * | 6/1999 | Jain et al. .................... 707/100 |
| 5,918,228 A | * | 6/1999 | Rich et al. ..................... 707/10 |
| 6,006,279 A | | 12/1999 | Hayes |
| 6,072,994 A | * | 6/2000 | Phillips et al. ................. 455/84 |
| 6,167,395 A | * | 12/2000 | Beck et al. ..................... 707/3 |
| 6,202,207 B1 | * | 3/2001 | Donohue .................... 717/173 |
| 6,332,146 B1 | * | 12/2001 | Jebens et al. ............... 707/104 |
| 6,370,573 B1 | * | 4/2002 | Bowman-Amuah ......... 709/223 |
| 6,519,594 B1 | | 2/2003 | Li |
| 6,526,566 B1 | | 2/2003 | Austin |

OTHER PUBLICATIONS

Office Action dated Apr. 10, 2003 from related U.S. Appl. No. 09/625,989.
Office Action dated Jun. 30, 2004 from related U.S. Appl. No. 09/625,989.
Office Action dated Nov. 26, 2003 from related U.S. Appl. No. 09/625, 989.

* cited by examiner

*Primary Examiner*—Charles L. Rones
*Assistant Examiner*—Hassan Mahmoudi
(74) *Attorney, Agent, or Firm*—Banner & Witcoff, Ltd.

(57) ABSTRACT

An apparatus for using a floating pallet for a digital asset management system in a plurality of different applications is disclosed. A single extension plug-in is created to interface with API's of all the plurality of different applications, wherein the extension plug-in communicates with the digital asset management system. The floating pallet for the digital asset management system is created in one of the plurality of different application wherein the floating pallet uses the properties and behaviors of a selected application. An indication that a file has been transferred from the digital asset management system to the selected application is then given.

2 Claims, 11 Drawing Sheets

SYSTEM FOR USING A FLOATING PALLET FOR A DIGITAL ASSET MANAGEMENT SYSTEM IN A PLURALITY OF DIFFERENT APPLICATIONS

FIELD OF THE INVENTION

The present invention relates to an asset management database system, and more particularly to an asset management database system using a multi-tiered server system.

BACKGROUND OF THE INVENTION

With the explosion of digital technology, more and more digital assets are being created. Digital assets can include, for instance, images, sound files, documents, logos, or anything else that can be stored digitally. As the number of digital assets grows in a company, it becomes harder to effectively manage these assets. Typically, digital assets are presently just stored on a file server somewhere and the only way to identify the asset is by the filename under which the asset is stored. Filenames however can also be very cryptic. The only way to perform a search of digital assets is by searching the filenames, which may not be very helpful if the filenames are not very descriptive. Furthermore, once you find a file that may or may not contain the digital assets that you are looking for, the file must be opened so that asset can be viewed. This can be a very slow, time-consuming process. Thus, there is a need for asset management system that efficiently and effectively organizes digital assets.

Another challenge with using digital assets is the need to interrupt ones work in one application to search for and retrieve a digital asset to be used in the first application. For example, if a user is writing an article and wants to insert a picture into the article, typically the user must leave the application that is being used to write the article and use at least one other application to find and retrieve the desired picture. This approach does not seem very integrated to the user Thus, there is a need for a way to create an extension of a plurality of programs for an asset management system so as to provide the user with a more integrated feel.

SUMMARY OF THE INVENTION

According to one embodiment of the present invention, a method for managing digital assets using a multi-tiered server system is disclosed. A path to a digital asset is first determined in a client server in response to a request. The digital asset is then opened by the client server. The digital asset is then rasterized to create a thumbnail image of the digital asset in the client server. The client server then extracts keyword data and other data from the digital asset. The client server then requests the second tier server to create a record for the digital asset. The path information, keyword data and thumbnail image from the client server is transferred to the second tier server wherein the second tier server stores the transferred information in the record. The transferred information is then reassembled to fit the structure of a third tier database. The reassembled data is then transferred to the third tier database and is stored therein.

According to another embodiment of the present invention, a method for managing digital assets using a multiple tiered server system is disclosed. A request is received at a client server to enter a digital asset into the system. The request is transferred to the second tier server and the second tier server determines a path to the digital asset in response to the request. The digital asset is then opened by the second tier server and rasterized to create a thumbnail image of the digital asset. Keyword data and other data is then extracted from the digital asset. The second tier server then creates a record for the digital asset. The path information, keyword data and thumbnail image are stored in the record. The stored information is then reassembled to fit the structure of a third tier database. The reassembled data is then transferred to the third tier database and is stored therein.

According to another embodiment of the invention, a multi-tiered server system for managing digital assets is disclosed. A client determines a path to a digital asset in response to a request, opens the digital asset, rasterizes the digital asset to create a thumbnail image of the digital asset, extracts keyword data from the digital asset, requests an application server to create a record, and transfers the path information, keyword data and thumbnail image to the application server. The application server stores the transferred data, reassembling the transferred data to fit structure of a third tier database, and transfers the reassembled data to the third tier database. The third tier database stores the reassembled data.

According to another embodiment of the invention, a multiple tiered server for managing digital assets is disclosed. A client interfaces with a user and receives a request to enter a digital asset into the system. An application server determines a path to a digital asset in response to the request, opens the digital asset, rasterizes the digital asset to create a thumbnail image of the digital asset, extracts keyword data from the digital asset, creates a record and stores the path information, keyword data and thumbnail image for the digital asset, and reassembles the stored information to fit structure of a third tier database. A third tier database stores the transferred reassembled data.

According to another embodiment of the invention, a method and apparatus for using a floating pallet for a digital asset management system in a plurality of different applications is disclosed. A single extension plug-in is created to interface with API's of all of the plurality of different applications, wherein the extension plug-in communicates with the digital asset management system. The floating pallet for said digital asset management system is created in one of the plurality of different applications wherein the floating pallet uses the properties and behaviors of a selected application. An indication that a file has been transferred from said digital asset management system to said selected application is then given.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION

Figure 1:
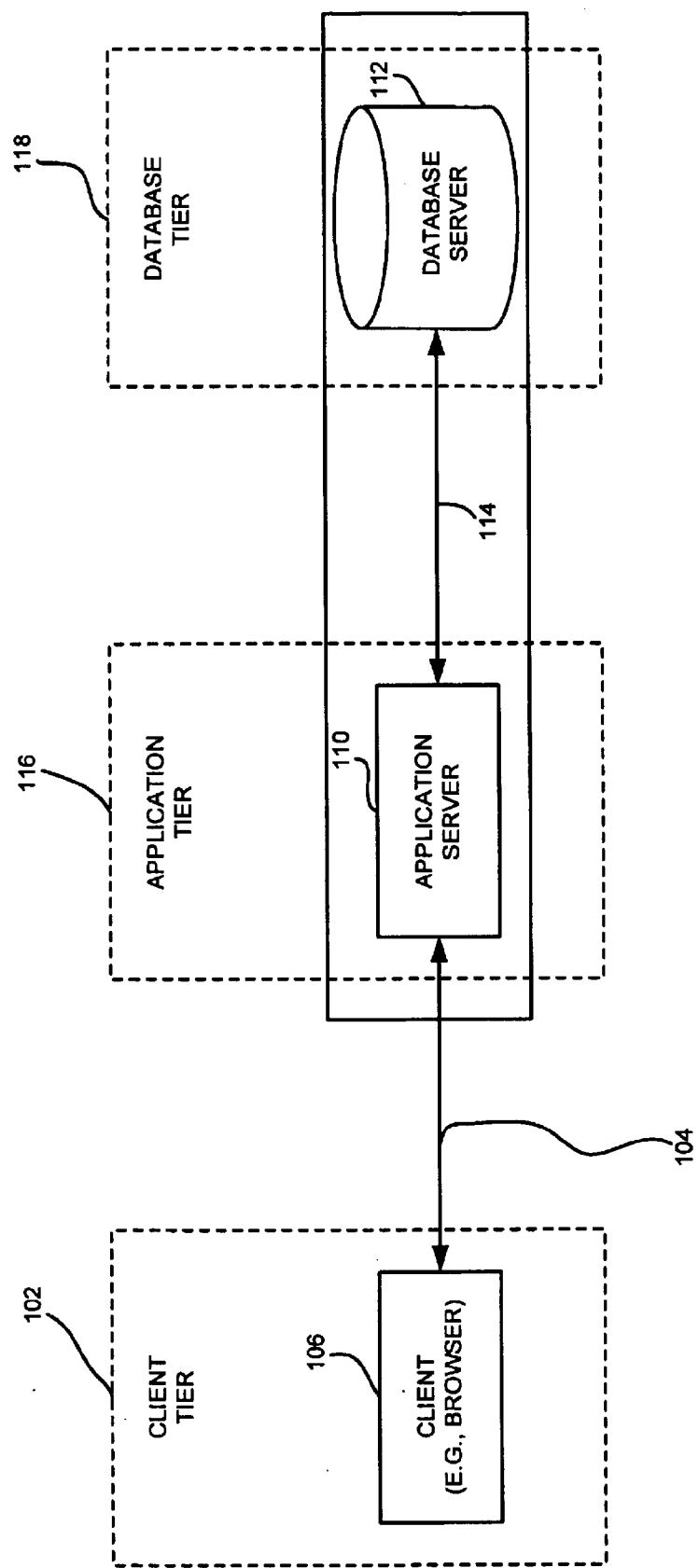
FIG. 1 is a block diagram illustrating an overview of a known three tiered server system.

Internet technology has enabled computer users to access increasing amounts of data for business and personal purposes. The Internet consists of computers linked to each other via a computer network using common communication protocols. Most networks implement the TCP/IP (Transmission Control Protocol/Internet Protocol) as a means for communicating between computers. The computers are designated as client computers or server computers. Client computers make requests for data from a server computer according to one of a number of available client/server protocols. Internet users currently favor the Hypertext Transfer Protocol (HTTP) because of its ease of use. Each HTTP enables users to select data based on a text or graphical icon or image on their client server that represents a link to particular remote data. The interlinking of data through hypertext links creates a web of links that can be navigated by the user to access the data he or she desires.

The basic network structure includes a network server and one or more network clients. The network server contains software that enables it to respond to a request for data from the client machines. Server software includes, for example, the Internet Connection Server software (ICS) from IBM Corp., the Lotus Domino Server from Lotus Development Corp., The Netscape SuiteSpot Server from Netscape Communications and the Internet Server Software from Microsoft Corporation. The above server software packages accept a request for information from the client system, locates the request for data and formats and presents the data back to the client. The data to be returned is typically contained on the server computer system or on a computer link directly to that system.

Client computer systems employ a browser comprising software necessary for the client system to format a request, transmit the request to the appropriate server and then to receive and format the response to the user. A number of commercial browsers are in use, including Netscape, Navigator and Netscape Communicator from Netscape Corporation and the Internet Explorer from Microsoft Corporation. The use of standardized client/server protocol's enables any browser conforming to the client protocol to communicate with any server having the reciprocal server protocol. This flexibility enables independent implementation of client and server technologies.

Communications between the client and the server take place over communication links such as telephone lines and computer to computer telecommunication links that are not inherently secure. Users of network computer systems have recognized the need for secure communications between the client and server system as essential for applications such as online banking, electronic ordering of products, and transmission of credit card or other financial transactions. Two secure network protocols account for the majority of secured transactions over the Internet.

Web servers, such as those described above, access local and remote data Companies that found that web servers and the Internet (termed the Internet when use is limited to a specific company or firm) provide an effective means for disseminating corporate data. This data is contained in corporate databases and often is managed by a older legacy information system. Enabling web access permits access to legacy data using modem graphical user interfaces in network tools without requiring a legacy system to be rewritten. The resulting combination of the web browser, server, and data systems is termed the three tier system model. The tiers include the client, a middle tier server such as the web server and backend data and file system servers.

FIG. 1 provides an overview of a three tier architecture. Client tier 102 typically consist of a computer system that provides a Graphical User Interface (GUI) generated by a client 106 via instructions from an application server 110, such as a browser or other user interface application. Client 106 generates a display from, for example, a specification of GUI elements (e.g., a file containing input, form, and text elements define using the hypertext markup language and/or from a applet (i.e., such as a program written using the java programming language that runs when it is loaded by the browser).

Further application functionality is provided by application logic managed by the application server 110 in application tier 116. The apportionment of application functionality between client tier 102 and application tier 116 is dependent upon whether a "thin client" or "thick client" topology is desired. Database tier 118 contains the data that is accessed by the application logic in application tier 116. Database server 112 manages the data its structure and the operations that can be performed on the data and/or its structure. Application server 110 can include applications such as a corporation scheduling, accounting, personal and payroll applications, for example. Application server 110 manages requests for the applications that are stored therein. Application server 110 can also manage the storage and dissemination of product versions of enterprise applications logic ie, the versions that are currently being used by the corporate users. Database server 112 manages the database (s) that manage data for applications. Database server 112 responds to a request to access the scheduling, accounting, personal and payroll application data for example.

Connection 104 is used to transmit enterprise data between client tier 102 and the application tier 116, and may also be used to transfer enterprise application logic to client tier 102. The client tier can communicate with the application tier via, for example, a remote method invocation (RMI) application programming interface (API). The RMI API provides the ability to invoke methods, software modules, that reside on another computer system. Parameter are packaged and unpackaged for transmittal to and from the client. Connection 114 between application server 110 and the database server 112 represents the transmission and request for data and the responses to such requests from applications that reside in application server 110. In these conventional systems, the client does not really know the problem to be solved but rather acts more like a terminal for allowing the user to make requests. Likewise, the third tier is simply a database. Almost all of the processing is done by the application server.

Elements of the client tier, application tier, database tier may execute within single computer. However, in a typical system, elements of the client tier, application tier and database tier may execute within separate computers interconnected over a network such as a LAN (Local Area Network) or WAN (Wide Area Network).

When a user wants to enter a digital asset into the system, the digital asset must be cataloged. First, the file path information must be determined and the image is then opened up. The system then rasterizes the image to create a thumbnail image of the digital asset. The system then extracts information from the digital asset to create keywords which are stored with the thumbnail image and can be searched. In addition, the path information and other information from the asset file can also be used to create keywords for the search. All of this information is then stored in a database when a user wants to perform a search for a digital asset, the user can enter keywords or search terms into the system and the system will then search the appropriate databases for any digital assets that meet the search criteria. The system will then return a list of thumbnail images which the user can look at to determine whether or not the digital asset has been found. The advantage of this system is that the images themselves do not need to be opened up in order to determine whether or not the correct digital asset has been found by the search.

The digital asset management system uses a multiple tiered server system to perform all of its functions. While the present invention is described using a three tiered server system, it would be understood that one skilled in the art that N-tiered systems such as four-tiered, five-tiered and six-tiered, etc., could also be used. In the N-tiered systems, multiple servers and be connected between the client and the last tier database.

Figure 2:
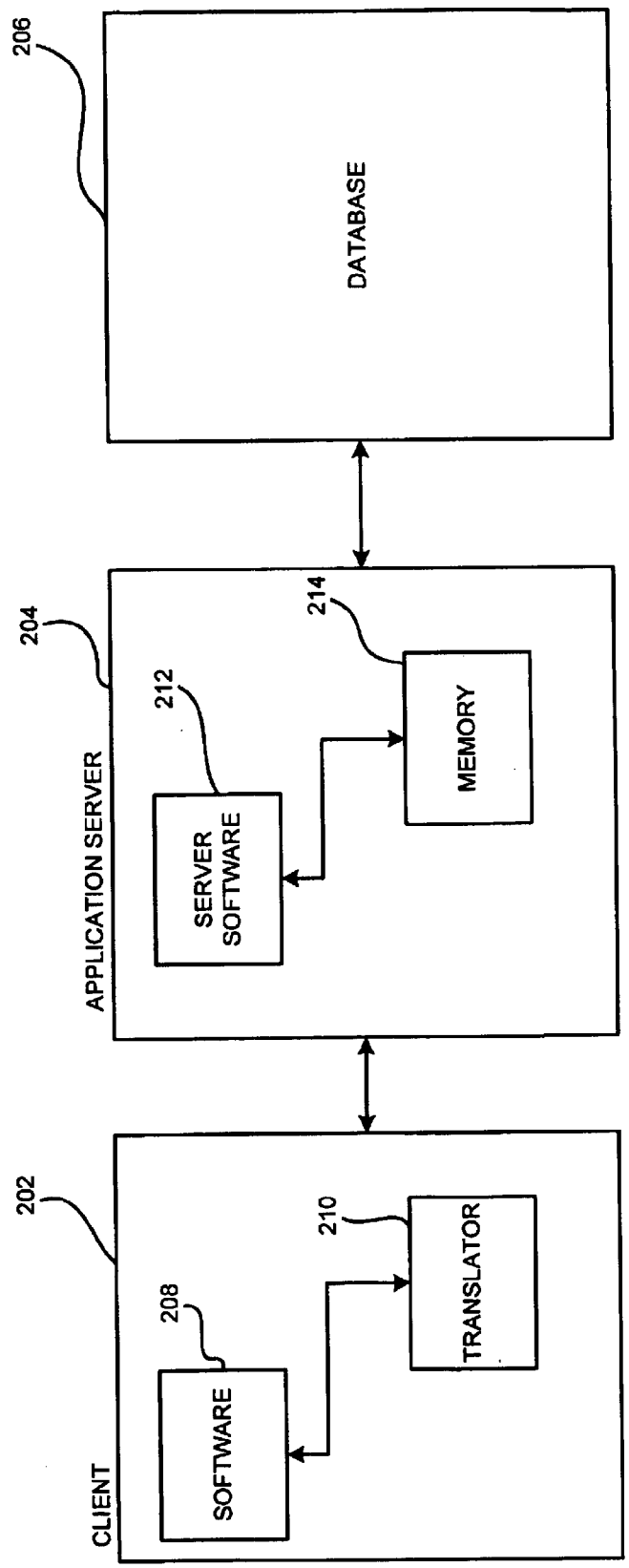
FIG. 2 is a block diagram of a three tier server system according to the one embodiment of the present invention.

FIG. 2 illustrates a three-tiered server system according to one embodiment of the present invention. In FIG. 2, the server system is made up of three tiers: a client 202, an application server 204, and a database 206. The server 202 contains client software 208 for controlling the operation of the client 202. Likewise, the application server 204 contains server software 212 for controlling the operation of the application server. Among other elements, the server 202 comprises a translator 210 which is used to rasterize the image to create the thumbnail images of the digital assets. The application server comprises, among elements, a memory 214 for creating records for the digital assets.

Figure 4:
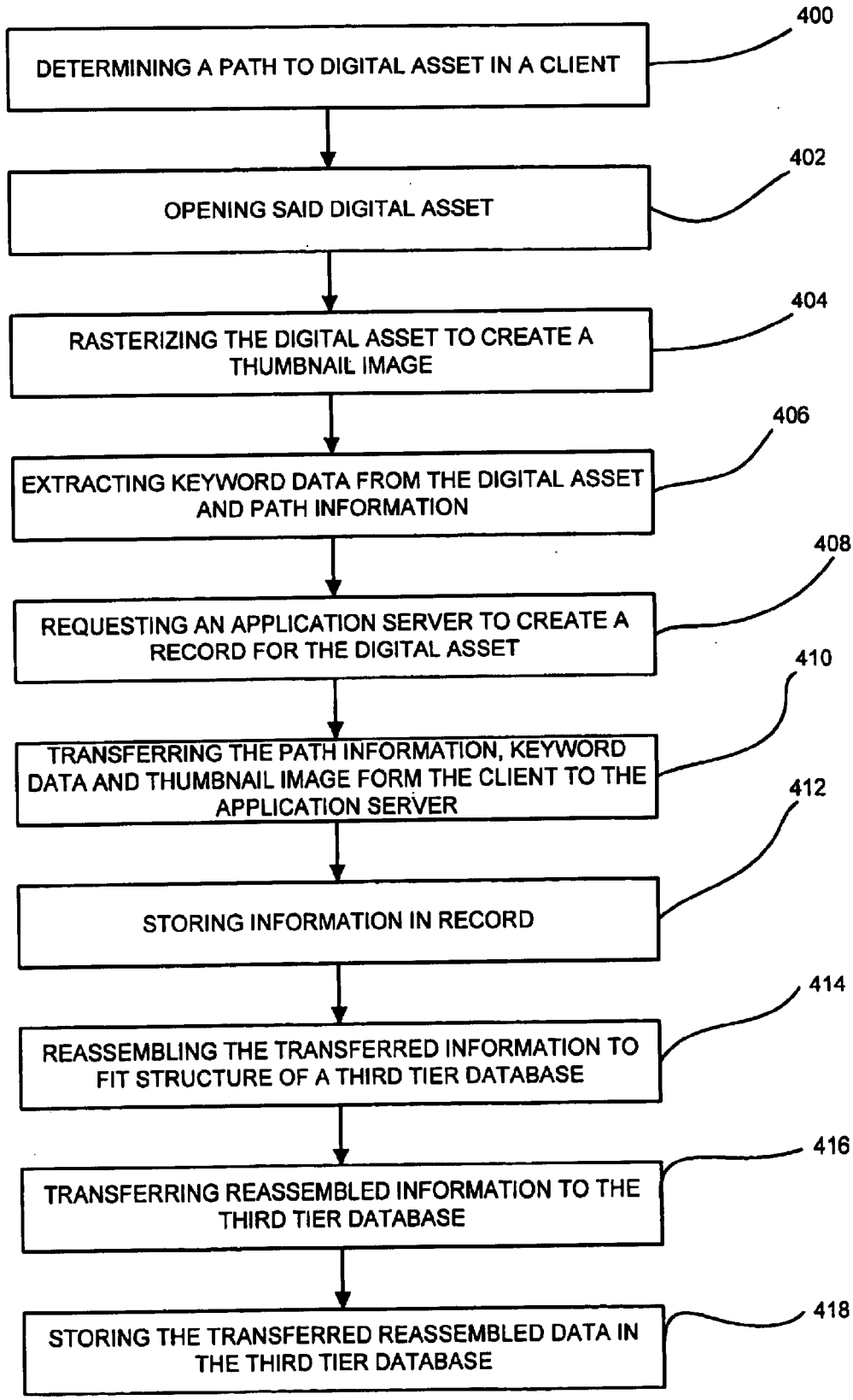
FIG. 4 is a flowchart illustrating the operation of the three tiered server system according to one embodiment of the present invention.

The operation of the three-tiered server system illustrated in FIG. 2 will now be explained with reference to FIG. 4. When the digital asset is to be entered into the digital asset management system, a request is made to enter the digital asset into the system. Once the request has been received by the client 202, the client determines the path information to the image for digital asset in step 400. The client 202 then opens the digital asset in step 402. The client includes a translator 210 which is used to rasterize the digital asset to create a thumbnail image of the digital asset in step 404. In addition, the client 202 contains means for extracting keyword data and other data from the digital asset and from the path information that has already been determined in step 406. For example, if the digital asset includes text, the text section can be searched for keywords that would be helpful to determine or to identify the digital asset. In addition, keywords can also be manually entered through a keyboard or the like by a user to describe or identify a digital asset.

The client 202 requests the application server 204 to create a record in its memory 214 from the digital asset in step 408. The path information, keyword data and thumbnail image are then transferred from the client to the application server in step 410 wherein the application server stores the transferred information in the record that is created in memory 214 in step 412. The client 202 may not know the structural makeup of the database 206 so the transferred data may need to be reassembled in order to fit the structure of the third tier database. The application server 204 knows the structure of the database 206 and thus reassembles the transferred information to fit the structure of the database 206 in step 414. Once the data has been reassembled, the data is transferred to the third tier database in step 416 where it is stored in step 418.

Figure 3:
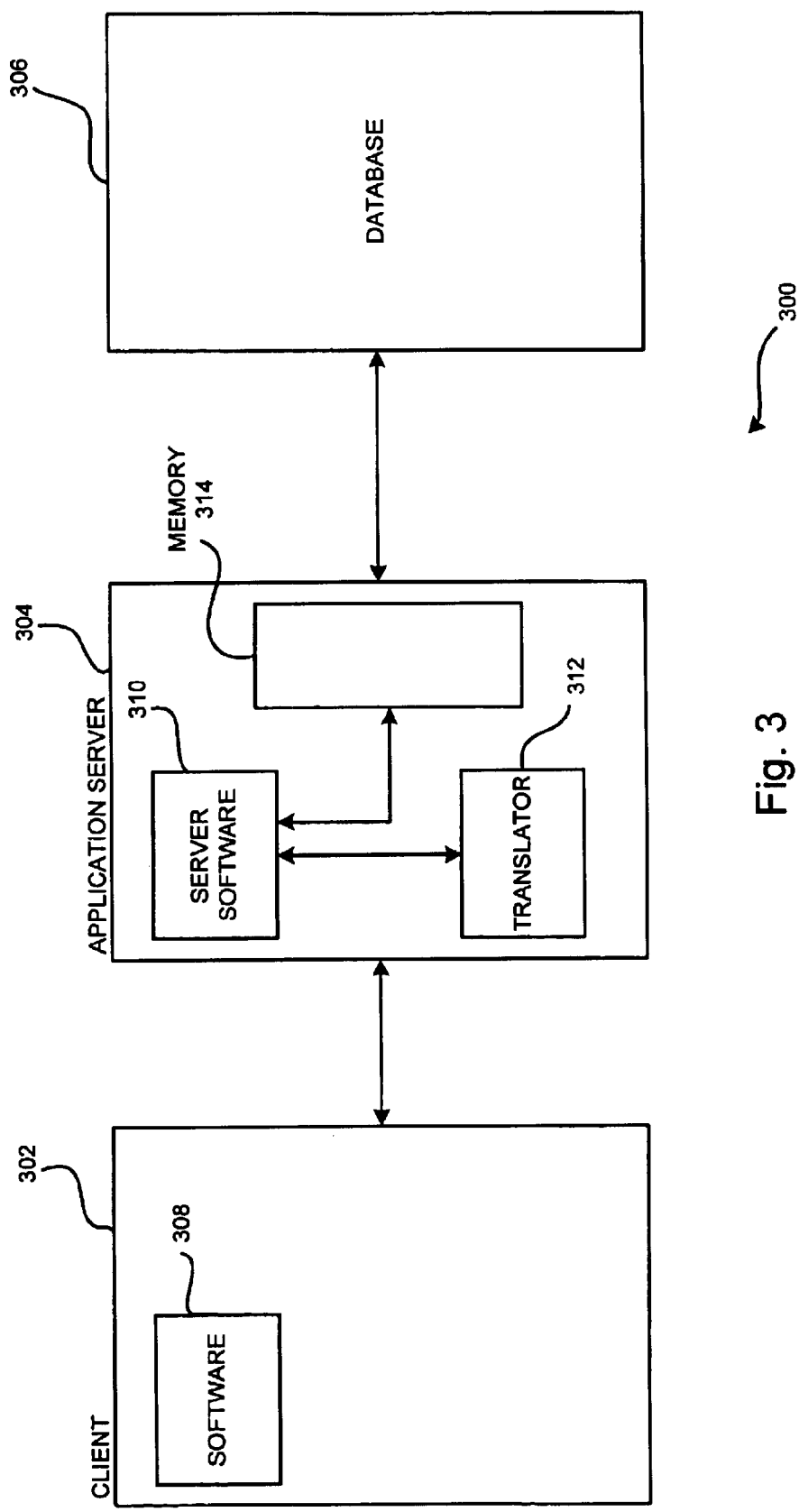
FIG. 3 is a block diagram illustrating a three tiered server system according to another embodiment of the present invention.

FIG. 3 illustrates a block diagram of a three tiered server system according to another embodiment of the present invention. The three tiered server system 300 comprises a client 302, an application server 304, and a database 306. The client 302 includes server software 308 in order to control the operation of the client 302. Likewise, the application server 304 includes server software 310 to control its operation. In addition, the application server contains a translator 312 and a memory 314.

Figure 5:
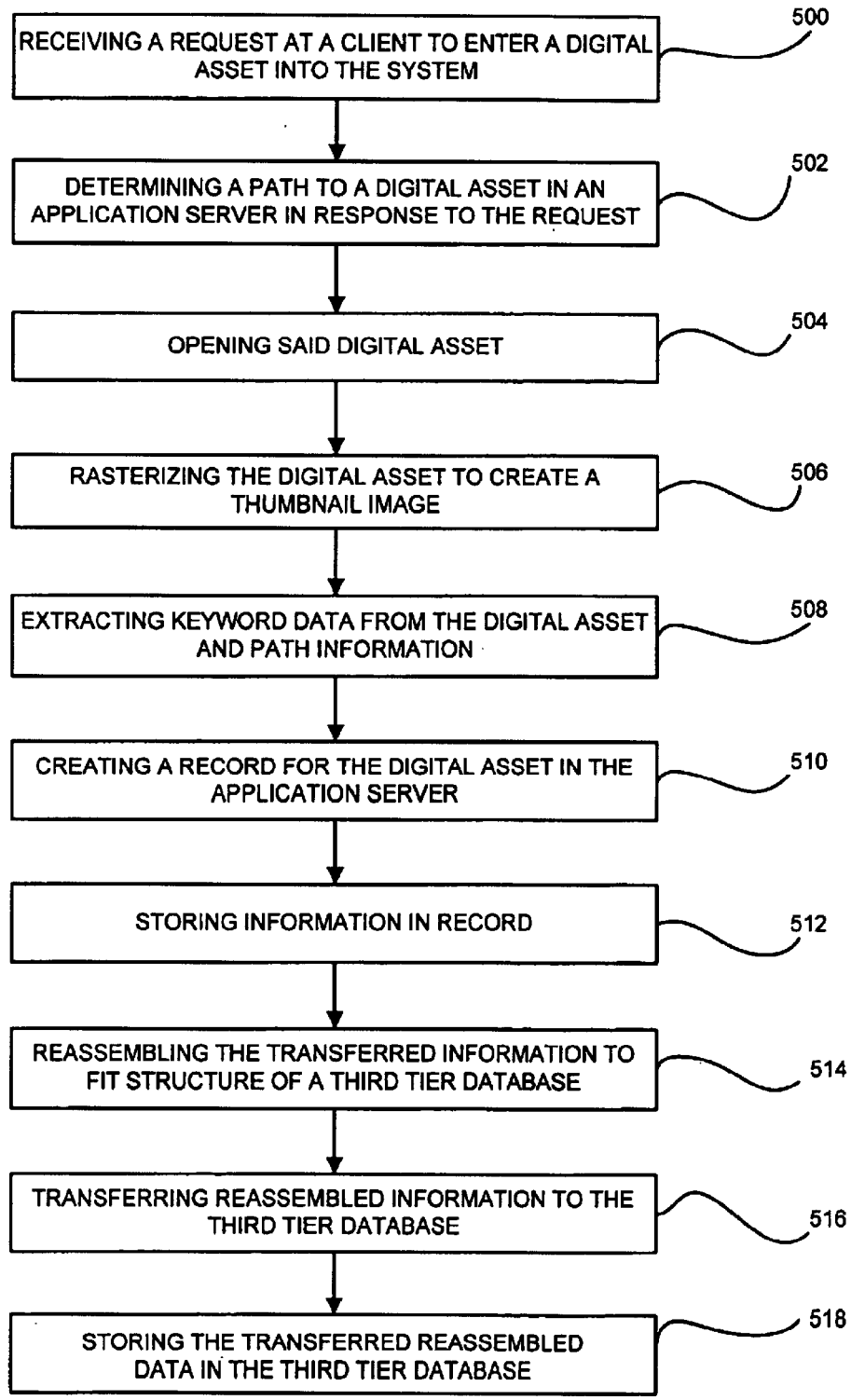
FIG. 5 is a flowchart illustrating the operation of a three tiered server system according to another embodiment of the present invention.

The operation of the three tiered server system illustrated in FIG. 3 will now be explained with reference to FIG. 5. When a user wants to enter a digital asset into the digital asset management system, the user requests the client to enter the digital asset in step 500. The client 302 transfers the request to the application server 304. The application server 304 then determines the path information to the image or digital asset in step 502 and opens the digital asset in step 504. The translator 312 then rasterizes the image to create a thumbnail image of the digital asset in step 506. The application server also extracts keyword data from the digital asset path information in step 508. The application server 304 creates a record for the digital asset in memory 314 in step 510 and stores the path information keyword data and thumbnail image for the asset in the record in step 512. The application server then reassembles the stored information to fit the structure of the third tier database in step 514. Alternatively, the application server may originally store the path information keyword data and thumbnail image in the appropriate format so as to be compatible with the third tier database. The reassembled data is then transferred to the third tier database in step 516 and then stored therein in step 518.

Figure 6:
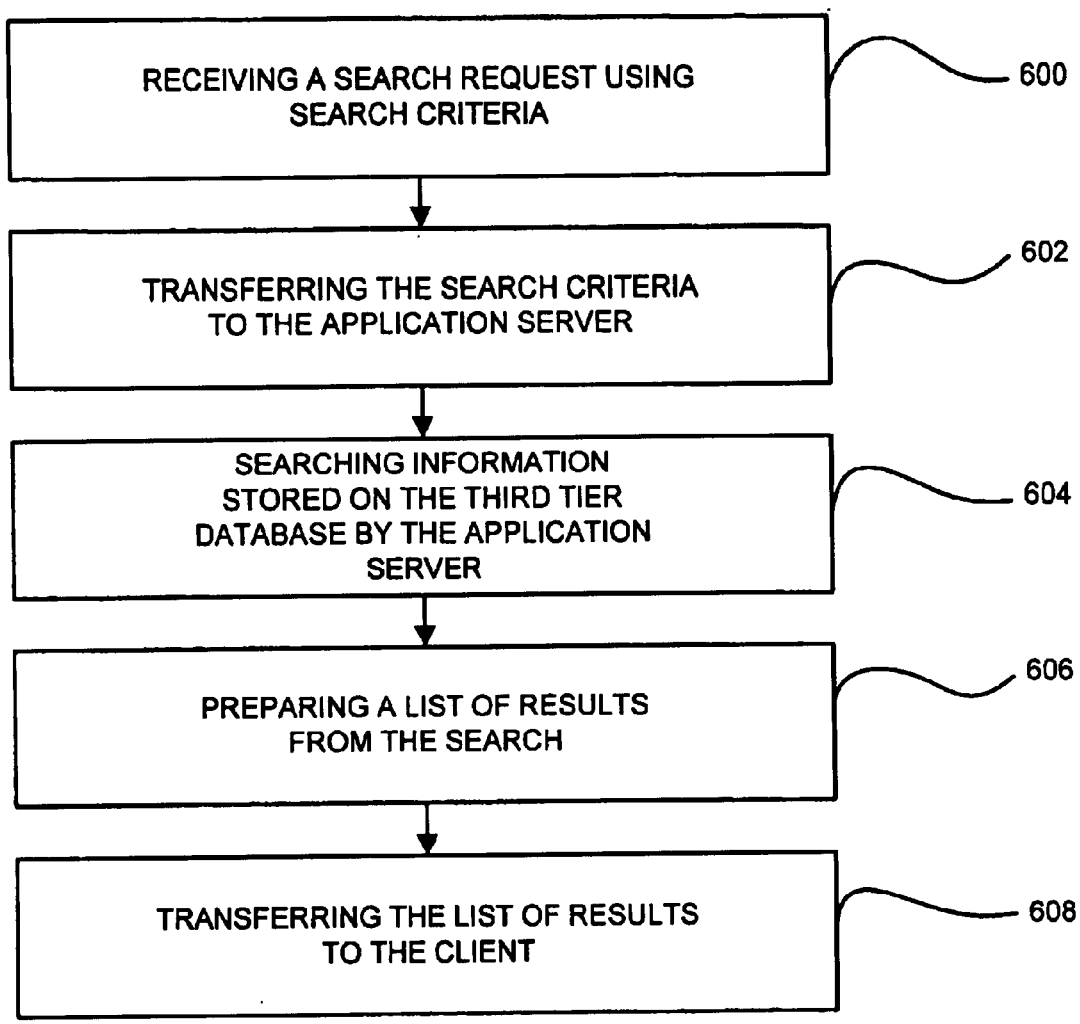
FIG. 6 is a flowchart depicting a search operation according to one embodiment of the present invention.

Once the digital asset has been stored in the multi-tiered server system, a user can then search all of the digital assets that are stored within the database or databases connected to the second tier server as illustrated in FIG. 6. For example, a search screen can be displayed on the client which asks the user to enter search criteria, such as keywords, for the search in step 600. Once the keywords or search criteria have been entered by the user, the client 202 transfers the search request and search criteria to the application server 204 in step 602. The application server 204 then searches the database 206 and any other database connected to the application server 204 using the search criteria in step 604. Any digital asset that meets the search criteria in the database(s) is then placed in a results list along with its thumbnail image in step 606. The result are then sent back to the client 202 for display in step 608. The user can then scroll through the thumbnail sketches to determine if any of the digital assets on the result list are the one he or she is looking for. A selected digital asset can then be dragged and dropped onto imaging programs such as Photoshop or desktop publishing applications such as QuarkXpress which will open the image.

According to another embodiment of the present invention, it would be advantageous to able to use the digital asset management system while in a different applications or programs such as QuarkXpress or Photoshop. One way to accomplish this is to create a floating pallet using a plug-in application programming interface API.

Many existing software applications support "plug-in" modules and are referred to as client applications to such plug-in modules. These plug-in modules provide the client applications with new or extended services. Plug-ins may, for example, provide specially tailored image filtering functionality to client applications. Several such client applications are Photoshop and QuarkXpress which are popular image processing and desktop publishing applications. It would be advantageous to be able to write a generic plug-in module for the above-described digital asset management system to add extended services to these and other applications.

Figure 7:
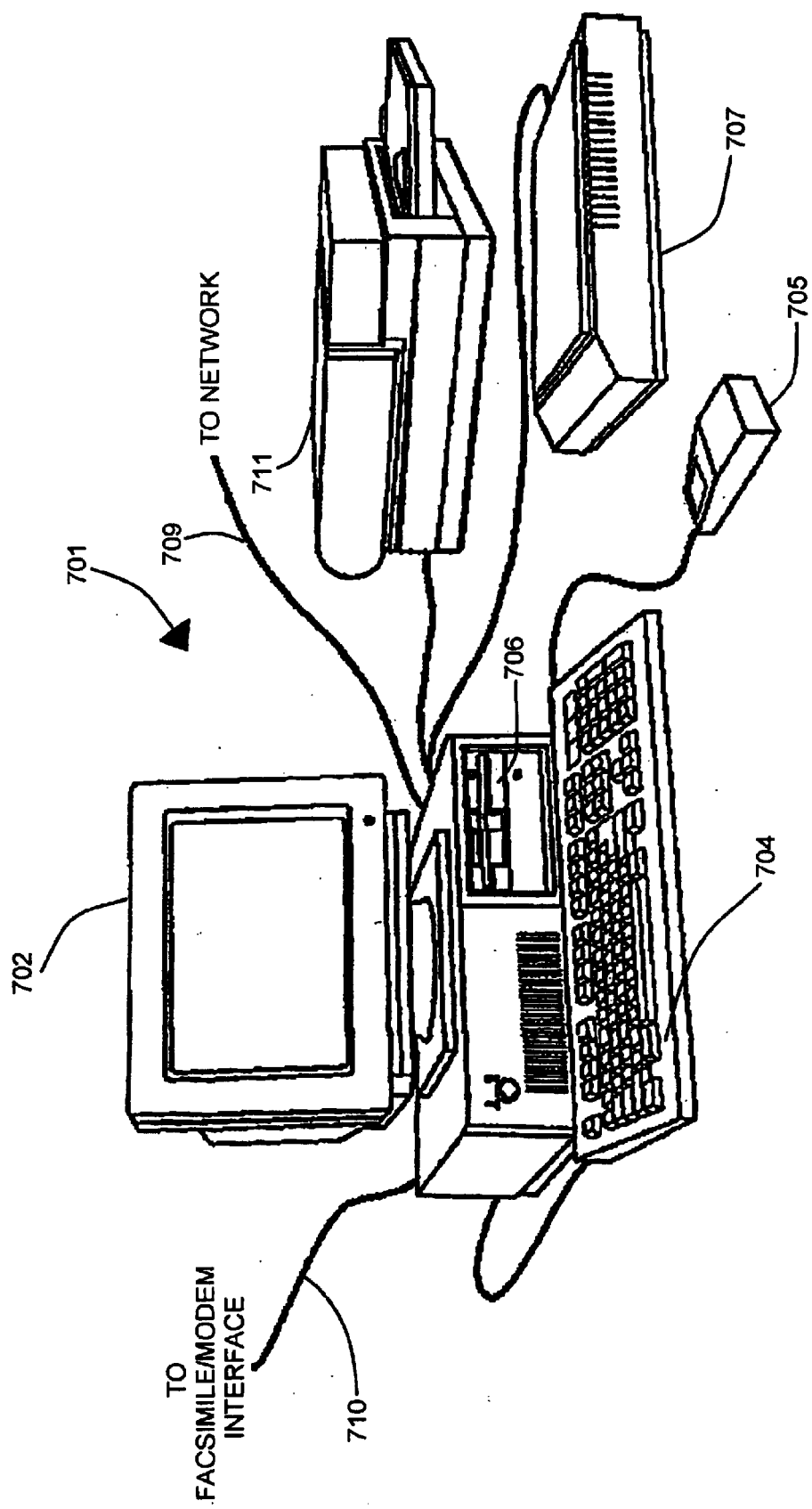
FIG. 7 is a representational view of a computer system for use with embodiments of the invention.

FIG. 7 is a representational view of a computer system for use with this embodiment of the invention. Computer system 701 may be a Macintosh or IBM PC or PC-compatible system having a windowing environment, such as Microsoft Windows. Provided with the computer system 701 is a display screen 702 which may be a color monitor, a keyboard 704 for entering user commands and a pointing device 705 such as a mouse for pointing to and for manipulating objects displayed on the display screen 702.

The computer system 701 also comprises a mass storage device such as a computer disk 706 for storing data files, peripheral drivers, application programs and for storing computer executable process steps embodying the invention. A scanner 707 is also included, and may be used to scan documents so as to provide bitmap images of those documents to the computer system 701. Images may also be inputted into the computer system 701 from a variety of other sources such as from a Local Area Network through network interface 709 or from the World Wide Web through facsimile/modem interface 710 or through the network interface 709. A printer 711 is provided for outputting processed images. It should be understood that although a programmable general purpose computer system is shown in FIG. 7, a dedicated, or stand alone, computer or other type of data processing equipment can also be used to execute the process steps of the invention.

Figure 8:
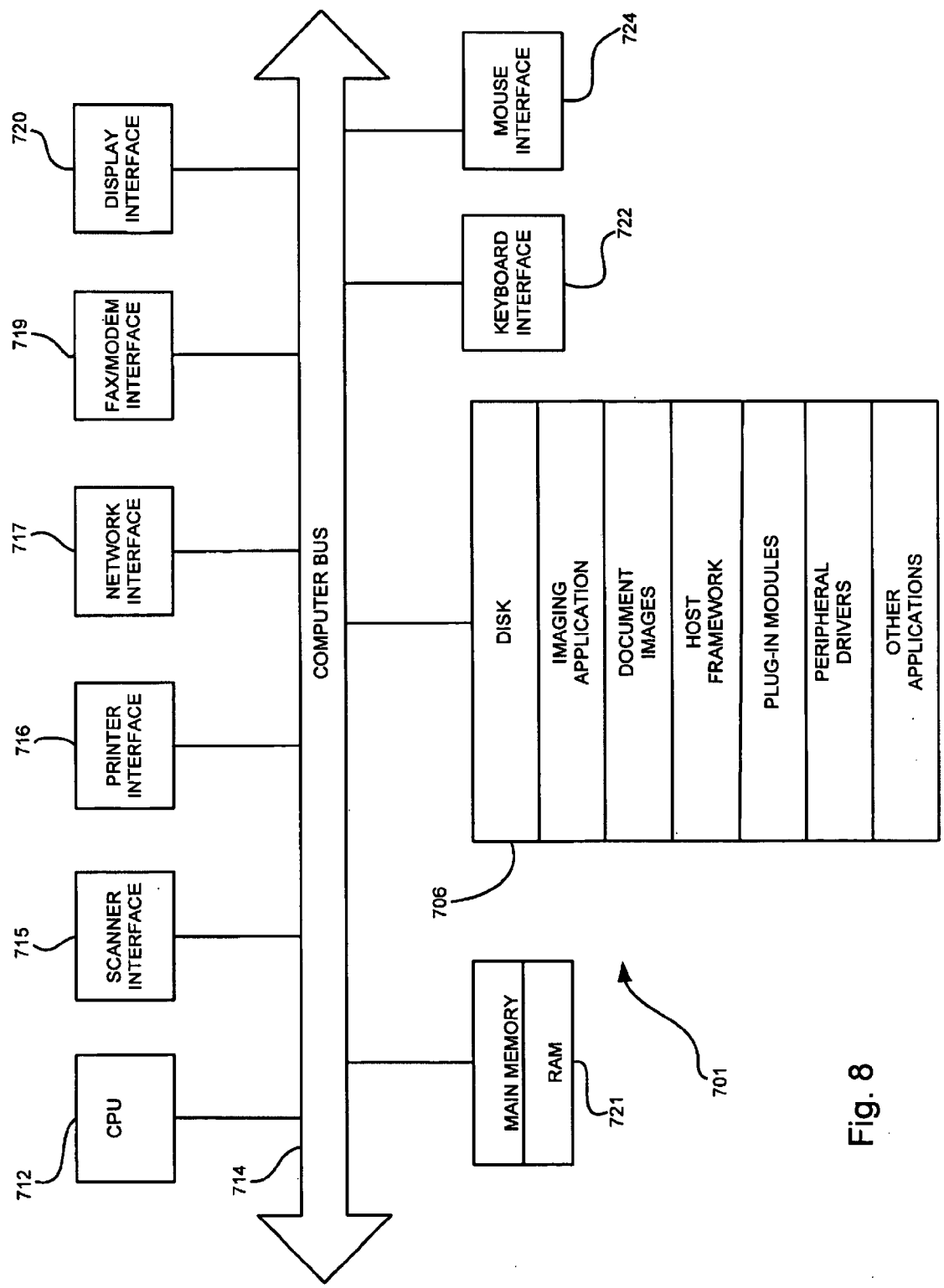
FIG. 8 is a block diagram of the internal architecture of the computer system illustrated in FIG. 7.

FIG. 8 is a detailed block diagram showing the internal construction of computer system 701. As shown in FIG. 8, the computer system 701 comprises a central processing unit CPU 712 that interfaces with a computer bus 714. Also interfacing with the computer bus 714 is a scanner interface 715, a printer interface 716, a network interface 717, a facsimile/modem interface 719, a display interface 720, a main random access memory RAM 721, a disk 706, a keyboard interface 722 and a mouse interface 724.

The main memory 721 interfaces with the computer bus 714 so as to provide RAM storage to the CPU 712 for executing stored processed steps such as process steps to implement a plug-in module host framework according to one embodiment of the invention. More specifically, the CPU 712 loads process steps from the disk 706 into the main memory 721 and executes the stored process steps from the memory 721 in order to provide a plug-in host API to a client application and to communicate to a plug-in module via a plug-in API. As also shown in FIG. 8, the disk 706 contains document images in either compressed or uncompressed format, peripheral drivers, and other application programs.

Figure 9:
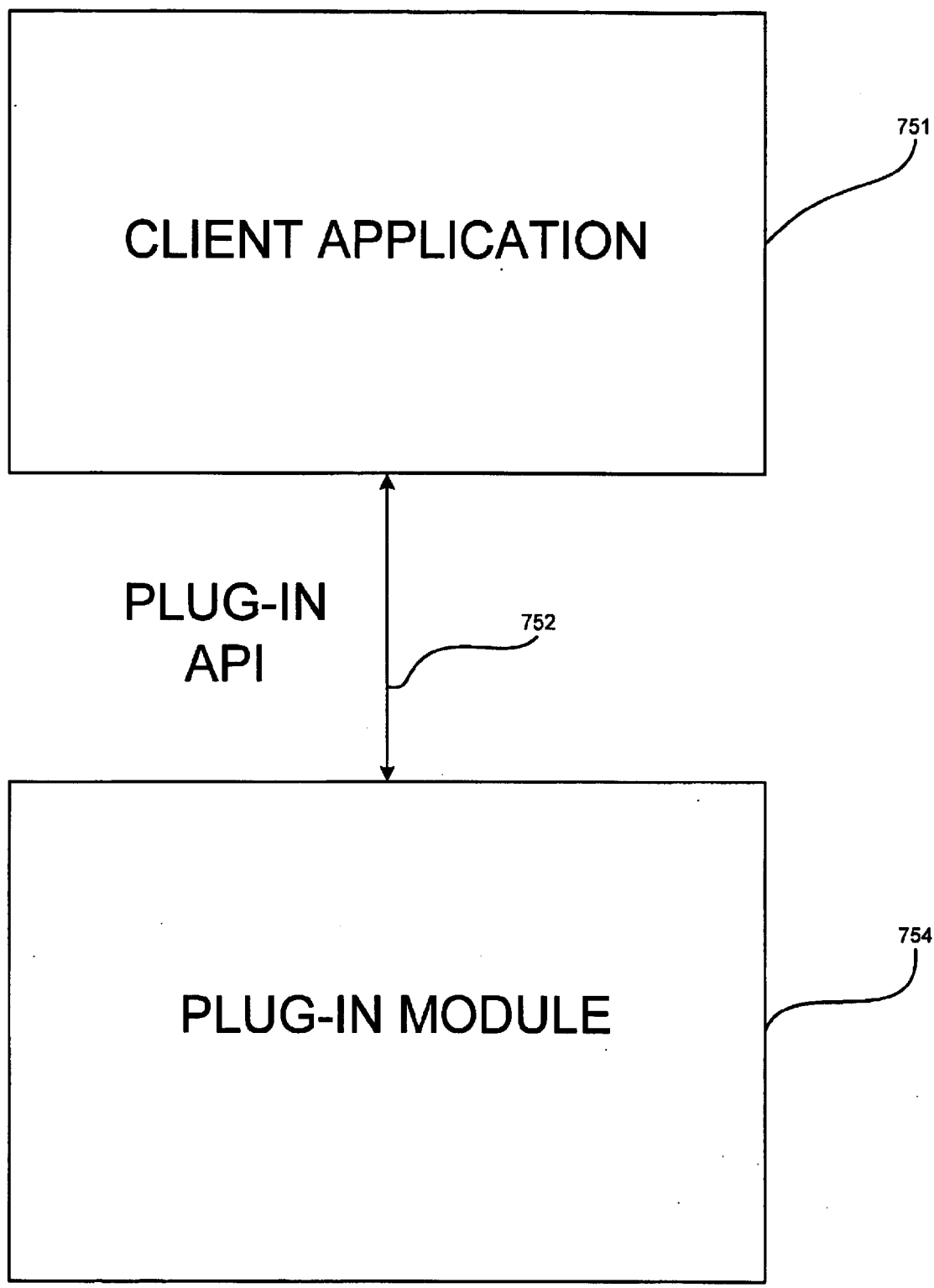
FIG. 9 is a functional block diagram depicting conventional communications between a client application and a plug-in module.

FIG. 9 depicts conventional communications between a client application and a plug-in module. As shown in FIG. 9, client application 751 communicates with plug-in module 754 via a plug-in module API 752. The client application 751 maybe any application which supports plug-in modules.

Figure 10:
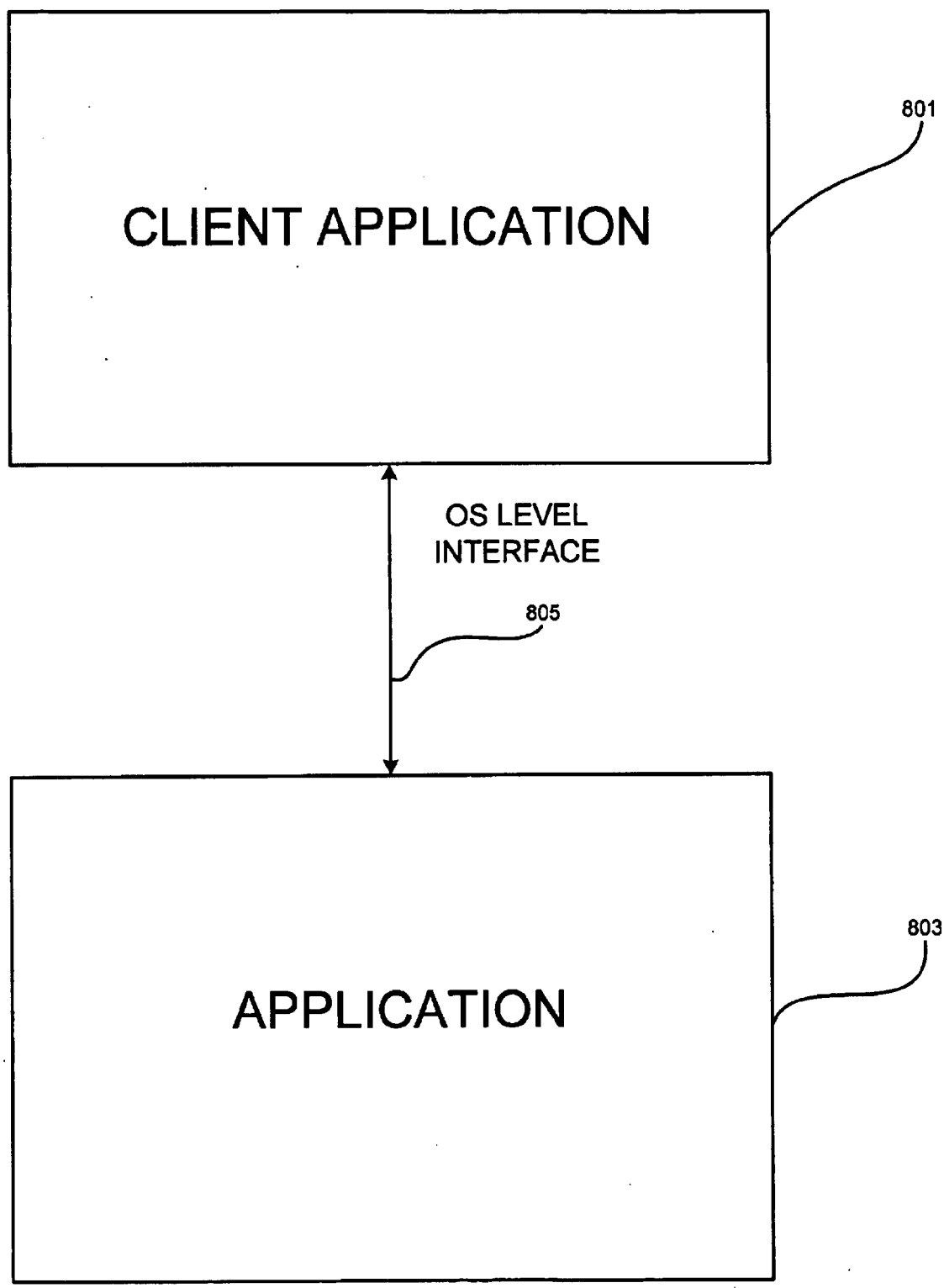
FIG. 10 is a functional block diagram depicting communications between a client application and an application according to one embodiment of the invention.

According to one embodiment of the invention, a simple extension "plug-in" for a plurality of image processing and desktop publishing systems which simply communicates with the digital asset management system and the selected image processing or desktop publishing system. According to one embodiment of the invention, an application which mimics the operation of a plug-in is used to create a simple means for interacting with a plurality of different systems. As illustrated in FIG. 10, a client application 801 communicates with an application 803 via a operating system level interface 805.

According to one embodiment of the invention, the application 803 uses the APIs of the operating system to create the API's needed to connect to the different processing and publishing systems. In this embodiment, the application calls the same API that the operating system would call to interact with the client application.

Attentively, the application can intercept a call to the operating system and redirect the call back to the application. When a client application wants to communicate with the operating system, the application links to a stub library which has the address of the operating system. According to one embodiment of the invention, the application 803 changes the address in the stub library for the operating system to the address of the application 803. Now when the client application calls the operating system, the stub library points the client application to the appropriate functional procedure in program 803. Likewise, according to one embodiment of the invention, the application 803 can intercept a call from the client application to the operating system. The application 803 can also interface with the client application using the same API that the operating system uses to interact with the client application An example of how the above-identified asset management system can interface with a desktop publishing system will now be disclosed but it will be understood that this example is illustrative rather than restrictive. When the desktop publishing system is installed on a computer system, an installation management section of the computer can prompt the user with a list of applications that are presently running on the computer or are installed on the computer. The user can then select wheat application(s) should also be running when the desktop publishing system is running, for example, the asset management system. The computer records the users selections along with a unique identifier for the desktop publishing system. When the desktop publishing system is launched, a background application running on the computer detects the start of the desktop publishing system and then checks to see what other applications should be launched in response to the launch of the desktop publishing system. As a result, in this example, the asset management system is launched. The asset management system determines whether its floating pallet was open or closed the last time the desktop publishing system was being used. If the floating pallet was open, the asset management system creates a child window in the parent window of the desktop publishing system to display the floating pallet.

Figure 11:
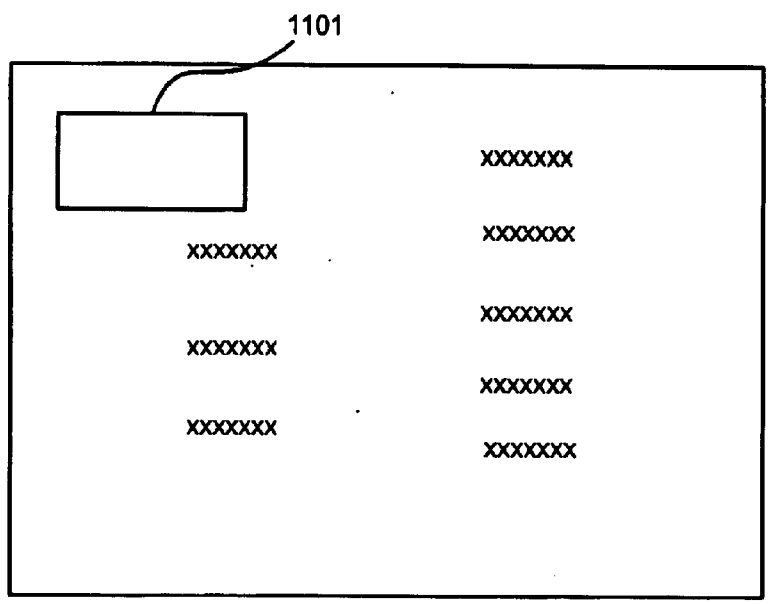
FIG. 11 illustrates a floating pallet inside a parent application according to one embodiment of the present invention.
Figure 12:
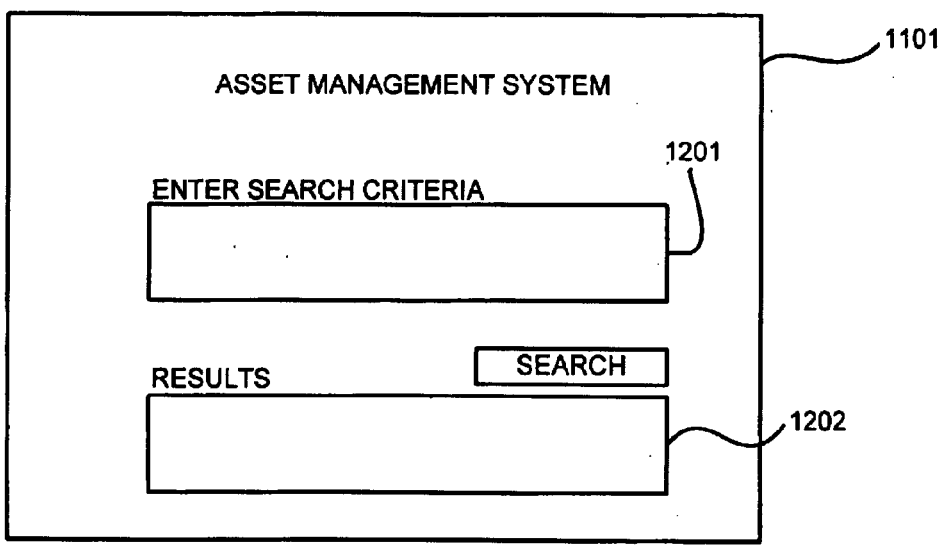
FIG. 12 illustrates a search window for the floating pallet for a digital asset management system.

Once the plug-in for the asset management system has been added to the client image processing system, the user can go to a menu and request that the asset management system be represented by a floating pallet 1101 as illustrated in FIG. 11. If the user wishes to use the asset management system to locate a digital asset for incorporation into a document being prepared, the user clicks on the floating pallet 1101. The floating pallet may contain a search field 1201 in which the user can enter search criteria as illustrated in FIG. 12. The search criteria is them sent to the asset management system which is running in the background through the application "plug-in". The digital asset system performs the search as described above with reference to FIG. 6 and sends the list of results back to the client application through the extension plug-in for display in 1202.

It would be understood from the foregoing description that various modifications and changes may be made in the preferred embodiments of the present invention without departing from its true scope. It is intended that this description is purposes as illustration only and should not be construed in a limiting intent. The scope of this invention should be limited to only be the language of the following claims.

We claim:

1. An apparatus for using a floating pallet for a digital asset management system in a plurality of different applications, comprising:

means for creating a single extension plug in to interface with API's of all of said plurality of different applications, wherein said extension plug-in communicates with said digital asset management system;

means for creating said floating pallet for said digital asset management system in one of said plurality of different applications wherein the floating pallet uses the properties and behaviors of a selected application; and means for indicating that a file has been transferred from said digital asset management system to said selected application.

2. The apparatus according to claim 1, further comprising:

means for using said floating pallets to request a search of digital assets using user entered search criteria;

means for transferring said search criteria to said digital asset management system through said extension plug-in;

means for performing said search and creating a list of results;

means for transferring said list of results back to said application through said extension plug-in; and means for displaying said list of results in said application.

* * * * *